United States Patent
Sastry

Patent Number: 6,104,962
Date of Patent: Aug. 15, 2000

[54] SYSTEM FOR AND METHOD OF ALLOCATING PROCESSING TASKS OF A CONTROL PROGRAM CONFIGURED TO CONTROL A DISTRIBUTED CONTROL SYSTEM

[75] Inventor: Shivakumar Sastry, Mayfield Heights, Ohio

[73] Assignee: Rockwell Technologies, LLC, Thousand Oaks, Calif.

[21] Appl. No.: 09/048,915

[22] Filed: Mar. 26, 1998

[51] Int. Cl.[7] .................................................. G05B 19/42
[52] U.S. Cl. ................................. 700/86; 700/2; 700/20; 700/99; 709/105; 709/226; 709/229
[58] Field of Search .................................. 700/86, 2, 3, 4, 700/8, 9, 10, 17, 20, 19, 87–89, 99; 709/1, 100, 104, 105, 201–205, 217–219, 220, 221, 222, 223, 224, 225, 226, 229, 251; 714/21, 717

[56] References Cited

U.S. PATENT DOCUMENTS

| | | | |
|---|---|---|---|
| 5,142,469 | 8/1992 | Weisenborn | 700/17 |
| 5,530,643 | 6/1996 | Hodorowski | |
| 5,796,603 | 8/1998 | Hodorowski | 700/2 |
| 5,838,563 | 11/1998 | Dove et al. | 700/83 |
| 5,909,368 | 6/1999 | Nixon et al. | 700/2 |
| 5,940,294 | 8/1999 | Dove | 700/83 |
| 6,014,612 | 1/2000 | Larson et al. | 702/183 |
| 6,021,433 | 2/2000 | Payne et al. | 709/219 |
| 6,032,208 | 2/2000 | Nixon et al. | 713/1 |

*Primary Examiner*—Joseph E. Palys
*Assistant Examiner*—Rijue Mai
*Attorney, Agent, or Firm*—Diane M. Sangalli; John J. Horn; William R. Walbrun

[57] ABSTRACT

A method and system for allocating programming objects of a control program configured to control a distributed control system having a plurality of distributed control modules. A graph model of the distributed control system is constructed which represents all the possible allocations of the control program's virtual programming objects to the processing resources associated with the system's control modules. A maximum matching algorithm is applied to the graph model to determine an optimum allocation, which, for instance, may be the allocation that provides the maximum benefit. The system and method also provide for intervention by the user to refine or "tune" the allocation process. Further, the system and method provide for iteratively solving the graph matching problem, thus reducing the computation time for allocating the programming objects of a complex distributed control system

36 Claims, 5 Drawing Sheets

SYSTEM FOR AND METHOD OF ALLOCATING PROCESSING TASKS OF A CONTROL PROGRAM CONFIGURED TO CONTROL A DISTRIBUTED CONTROL SYSTEM

FIELD OF THE INVENTION

The present invention relates generally to distributed control systems including a control program and a plurality of distributed programmable control modules. More particularly, the invention relates to a method and system that uses a maximum matching algorithm to allocate processing tasks to the various programmable control modules for execution.

BACKGROUND OF THE INVENTION

Distributed control systems typically include distributed high-speed processors or controllers that may be connected to industrial equipment, such as automated assembly lines or machine tools, to operate the equipment in accordance with a control program. In a distributed control system, responsibility for execution of the control program is divided among the processors rather than being consolidated in a centralized controller. The control program is partitioned in accordance with an allocation scheme and the resulting portions of program code are distributed and stored in each of the memories associated with the various processors. Distributing the control program in this manner enables concurrent processing, thus providing an extremely fast execution time. Moreover, amongst its multiple other advantages, building a control system out of relatively independent control modules can reduce system development costs, increase system functionality, reduce communication loads, and provide a more fault-tolerant system in which single points of failure are eliminated or reduced. However, distributing control among the various controllers introduces other complexities such as, for example, task synchronization and efficient resource management.

Efficiently managing resources involves optimizing the allocation of processing tasks to the distributed controllers. In the area of general distributed computation, the problem of allocating processing tasks to distributed controllers has been approached in many ways, ranging from simple manual methods to more complex mathematical methods. Such mathematical methods typically involve intensive computations based on well-known strategies, such as weighted voting, network flow, spectral partitioning and geometric partitioning.

These known approaches, however, do not work satisfactorily in the context of industrial automation systems, principally because they fail to optimize resource utilization and ignore system considerations, such as load balancing, task synchronization, scheduling criteria and critical loop timing requirements. Incorporating all these considerations in the framework of a mathematical model is difficult and, even if possible, would explode computational requirements beyond the industry's cost/performance targets. Approaches based on such mathematical models also do not permit user participation in the allocation process.

Accordingly, there is a need for an innovative method to efficiently allocate the numerous processing tasks of a distributed control system to the various distributed controllers. Such a method would optimize utilization of the system's processing resources while also taking into consideration the system's other task-related and cost-related constraints and would provide for intervention by a user to refine the allocation process. The method also would reduce the amount of computation time required to determine an optimum allocation regardless of the complexity of the distributed control system. After determining the allocation, the control program stored in the main controller would be partitioned and the resulting portions would be transferred to and stored in the memory associated with each distributed controller.

SUMMARY OF THE INVENTION

The present invention provides a system and method for allocating a distributed control system's processing tasks to the various distributed controllers. The system and method optimally allocate the tasks by taking into consideration the processing capabilities of each distributed controller together with the distributed control system's task-related and cost-related constraints.

A first embodiment of the invention provides a method for allocating a plurality of programming objects of a control program configured to control a distributed control system. The control system includes a plurality of controller nodes that are connected to a communications link. The system's control program includes program code corresponding to the plurality of programming objects, which may be virtual objects and/or non-virtual objects. To allocate the programming objects to the controller nodes, logical relationships among the programming objects are identified and the processing resources associated with each of the controller nodes are identified. The allocation method then determines possible allocations of the virtual objects of the control program based on the identified logical relationships and the identified processing resources. A graph is constructed which represents a model of at least a portion of the possible allocations. The graph model includes a first set of vertices corresponding to at least a first portion of the virtual objects, a second set of vertices corresponding to the available processing resources, and a set of edges interconnecting the first and second set of vertices in accordance with the possible allocations. A maximum matching algorithm is applied to the graph model to determine an allocation of at least a portion of the virtual objects to the controller nodes.

In accordance with another embodiment of the invention, a distributed control system is configured by identifying logical relationships among the control program's programming objects and identifying the processing resources associated with each of a plurality of distributed control modules. A graph model is constructed that represents the possible allocations of at least a first portion of the programming objects to the processing resources, which are based on the identified logical relationships and the identified processing resources. A maximum matching algorithm is then applied to the graph model to determine an allocation of at least a portion of the programming objects. The control program's code is then partitioned based on the resulting allocation, and the portions of the code are transferred and stored in the memory circuit of the respective control modules.

According to a further aspect of the invention, only virtual objects are modelled and allocated using the maximum matching algorithm. Non-virtual objects are allocated based on the physical locations of the processing resources relative to the physical or spatial locations of the physical components associated with the non-virtual objects.

In yet another aspect of the invention, each edge of the graph model is assigned a weight having a magnitude that represents a benefit associated with allocating that particular programming object to that particular processing resource. The maximum matching algorithm is a weighted maximum matching algorithm which determines an allocation that represents an optimum benefit. The optimum benefit may be the maximum benefit.

A still further aspect of the invention reduces the computation time required to determine an allocation for a distributed control system having a very large number of programming objects and processing resources. According to this aspect, a first graph model of the distributed control system is constructed which represents possible allocations of at least a first portion of the programming objects to the processing resources. The maximum matching algorithm then is applied to determine an allocation of the at least first portion of the programming objects to the processing resources. A new graph model is then constructed which represents possible allocations of at least a second portion of the programming objects to the remaining processing resources. The maximum matching algorithm is then applied to the second graph model. These steps may be repeated until an optimum allocation is obtained.

Other aspects and advantages of the invention will become apparent from the detailed description given hereinafter. It should be understood, however, that the detailed description and specific embodiments are given by way of illustration only. Based on the following description, various changes and modifications within the spirit and scope of the invention will readily become apparent to those skilled in the art.

BRIEF DESCRIPTION OF THE DRAWINGS

The preferred exemplary embodiment of the invention will hereinafter be described in conjunction with the appended FIGURES, in which like reference numerals denote like elements and.

DETAILED DESCRIPTION OF A PREFERRED EMBODIMENT

Figure 1:
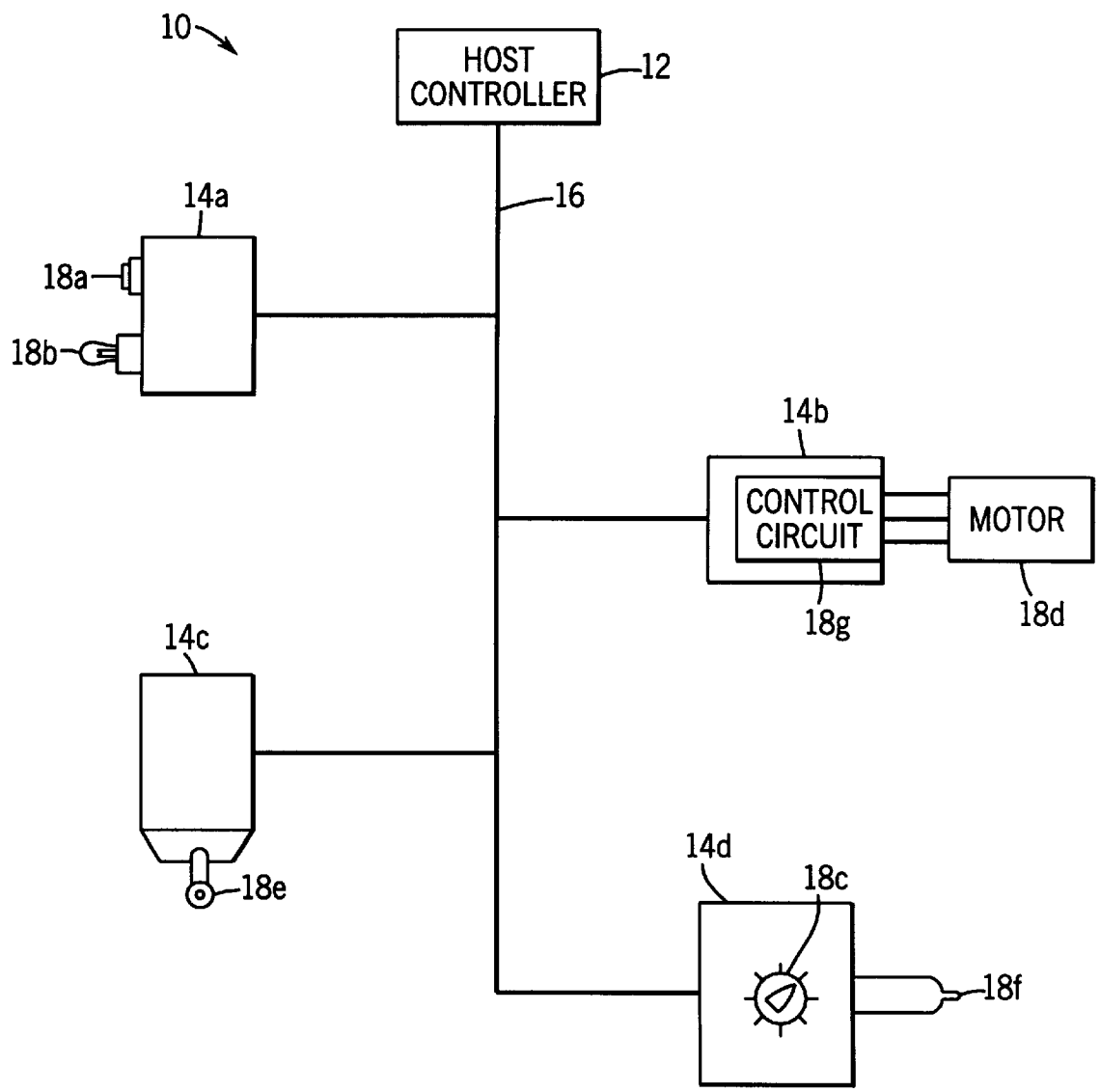
FIG. 1 illustrates a block diagram representation of a simple, distributed control system according to the present invention.

Referring to FIG. 1, a schematic block diagram illustrating a distributed control system 10 in accordance with a preferred embodiment of the invention is shown. System 10 includes a host controller 12 which communicates, via a communication link 16, with multiple controller nodes at which are located multiple control modules 14a–n. In the preferred embodiment, communication link 16 preferably comprises a cable of twisted copper conductors suitable for conveying digital data and most preferably is a shared communications link. Link 16 may also include power (e.g., 24VDC) and ground conductors for providing power to control modules 14a–n. Each control module 14 may be connected in parallel across communication link 16 such that digital data may be communicated among all control modules 14a–n. However, in implementing the operation of system 10, certain control modules 14 may communicate only with selected other control modules via communication link 16. Hence, the relationship between these selected modules 14 is considered to be virtual and is independent of any physical or spatial relationship among the modules 14. In alternative embodiments, communication link 16 may include multiple communication paths, each of which interconnect host controller 12 to one or more control modules 14. In other words, control modules 14 need not be connected in parallel across communication link 16 such that all control modules 14 are interconnected.

In addition to the virtual connections among modules 14a–n, each control module 14 may also be physically coupled to one or more physical components 18a–n of system 10 that cooperate in a controlled manner in performing the various assembly or fabrication tasks of system 10. Components 18 may include, for example, an actuator (e.g., a switch 18a,c, a valve, or an actuator arm 18e), an indicator (e.g., a light 18b or an alarm), a sensing device (e.g., a proximity switch, a thermocouple 18f, or a pressure transducer), or other electrical components, such as a transformer, a motor controller 18g, or a motor 18d, all of which have a physical manifestation and which have a spatial relationship, such as a physical connection, with a control module 14.

Figure 3:
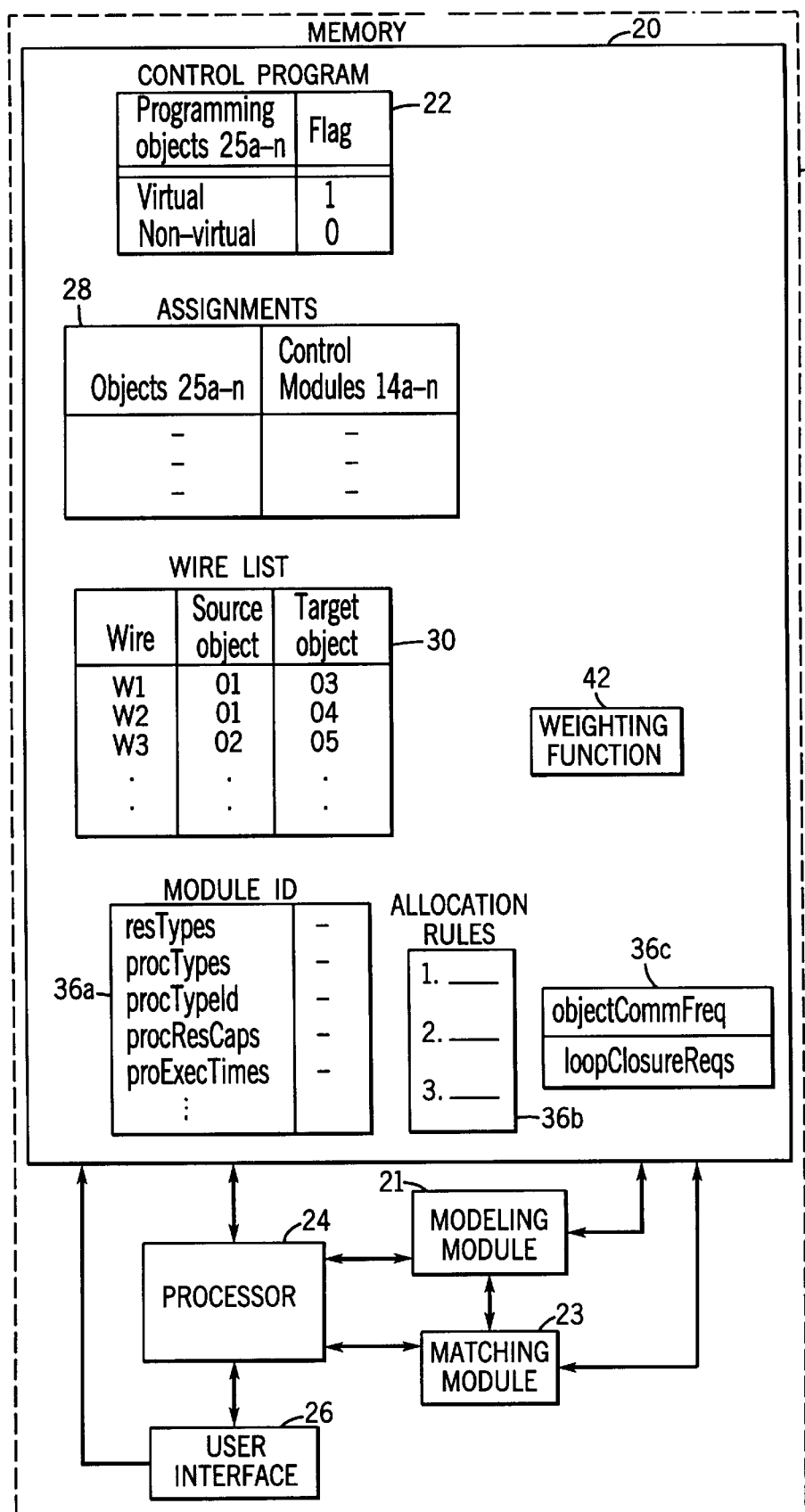
FIG. 3 is a block diagram representation of an exemplary embodiment of the host controller of FIG. 1, showing the data files and subroutines stored in memory and the modeling and matching modules which participate in configuring the distributed control system.

Referring ahead to FIG. 3, host controller 12, which may be a general purpose personal computer, also is coupled to communication link 16 and includes a memory 20 in which is stored a control program 22 that is configured to control the operation of system 10. Host controller 12 further includes a processor 24 (e.g., an x86, PENTIUM or equivalent processor) and a user interface 26, such as a graphical display that provides a visible output from processor 24 and a keyboard or mouse that permits a user to input data to controller 12. Host controller 12 also includes a modeling module 21 and a matching module 23 which contribute to the allocation of processing tasks to control modules 14a–n as will be explained more fully below. The results of the allocation are then used to partition control program 22. In the preferred embodiment of the invention, the allocation of processing tasks and partitioning of control program 22 is performed statically (i.e., before system 10 is in operation) and does not change while system 10 is executing program 22.

Control program 22 includes the program code corresponding to the various instructions or subroutines necessary to control the operation of system 10. The program code further includes numerous programming objects 25a–n which correspond (1) to elemental functions that require an interface to physical components 18a–n of system 10 and (2) to elemental functions which have no physical manifestation but which are necessary for the proper operation of system 10, such as summers, counters, comparators, timers, splitters and one-shots. The programming objects 25a–n associated with physical components 18a–n are considered to be non-virtual objects, while the programming objects 25a–n corresponding to non-physical elemental functions of control program 22 are considered virtual objects. In the preferred embodiment, programming objects 25a–n may be easily identified as either a virtual object or a non-virtual object by setting a flag in the program code of control program 22.

In controlling the operation of system 10, certain relationships must exist among programming objects 25a–n and may include both physical interconnections and logical (or virtual) interconnections. The physical interconnections quite simply represent the physical connections among physical components 18a–n which are associated with the non-virtual programming objects. The virtual interconnections, on the other hand, represent paths of information flow, and thus the logical relationships, that exist among both virtual and non-virtual objects and that are defined during the programming of system 10.

Programming of system 10 may be accomplished in many well-known manners, such as that described in U.S. Pat. No. 5,530,643, which is assigned to Allen-Bradley Company, Inc., and which is hereby incorporated by reference. In the preferred embodiment of the invention, a programmer employs programming software, including a commercial computer-aided design ("CAD") package (e.g., AutoCAD available from AutoDesk, Inc. of Sausalito, Calif.), to define a control program 22 for a particular application. As a result of the programming, the physical configuration of system 10 is defined, including determining the necessary hardware that must be installed, such as the particular control modules 14a–n, the associated physical components 18a–n, and the spatial or physical relationships among modules 14a–n and components 18a–n. The system's physical configuration may be represented in a circuit schematic, such as a schematic that may be produced by the CAD program. Preferably, the CAD program is further used to produce a data file 28 from the physical schematic, which provides information identifying which programming objects have a physical or spatial relationship with particular control modules 14.

Figure 2:
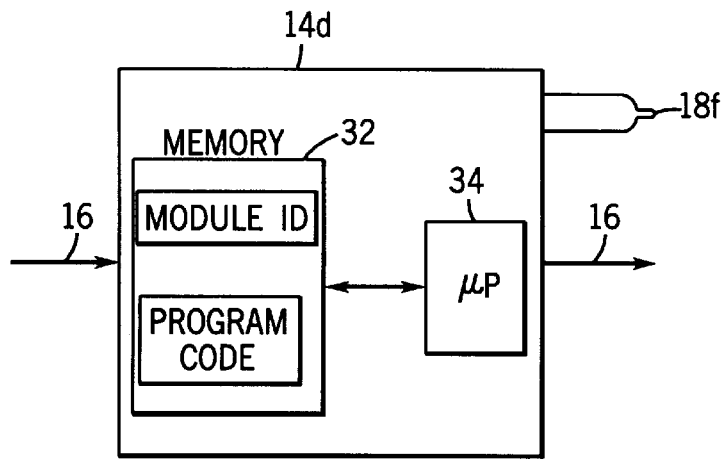
FIG. 2 is a representation of an exemplary control module of FIG. 1, in accordance with one aspect of the invention.

In addition to determining the physical layout, the programming defines the logical structure of system 10, thus identifying the data flow, or logical relationships, among programming objects 25a–n. This logical structure of system 10 may be represented as a logical schematic diagram, such as one that may be produced with the CAD program. The CAD program may also be used to distill the logical schematic into a wire list, which typically will provide three columns of data, including identifications of the interconnecting wires (which represent the logical relationships) and the adjacent programming objects 25 which communicate via the logical interconnections. In the preferred embodiment, the essential information of the wire list is then produced as a data file 30 from commercially available software tools, such as the PROMIS-E™ automatic documentation system manufactured by ECT, Inc. of Brookfield, Wis., which runs as an application inside the AutoCAD program Referring now to FIG. 2, control modules 14a–n each include a memory 32 and a microprocessor 34. The size of each memory 32 may vary among the control modules 14a–n. Each memory 32 stores a portion of the program code of control program 22 as determined by the allocation of programming objects 25a–n to the various modules 14a–n, as will be explained in detail below. Each microprocessor 34 may be any one of various types of general purpose processors, such as an x86, PENTIUM or equivalent processor. Allocation of a processing task to a particular module 14 depends, among other things, on the processing capabilities of the respective control module 14, which are constrained by the type of microprocessor 34, the size of memory 32, and the availability of other processing-related resources, such as timers, counters, summers, special purpose interface devices, etc. Each module 14 may be represented as one or more processing resources 38a–n in accordance with the module's processing capabilities, as illustrated generally in FIG. 6.

Turning now to FIG. 3, an exemplary host controller 12 is illustrated, including the contents of memory 20. Memory 20 stores control program 22, data files 28 and 30 and, preferably, also auxiliary data files 36. In the preferred embodiment, data files 36 contain information regarding the processing capabilities associated with each module 14. The information stored in files 36 is invoked by polling each control module 14 connected to communication link 16 and asking for a module identifier. The module identifier, which is stored in each memory 32 of control modules 14, may be a part number or catalog number of a commercially available control module or may be a special identifier associated with a custom-designed control module. In any event, in response to the query, each control module 14 communicates the module identifier to host controller 12. Controller 12 uses the module identifier to access data files 36 to determine the processing capabilities of each module 14. For example, files 36 may identify the type or types of microprocessor 34 which correspond to the module identifier, the different types of programming objects 25a–n supported by each module 14, the maximum number of each type of programming object 25 supported by each module 14, and the execution time required by each type of module 14 to execute the program code corresponding to each type of programming object 25. The data listed in files 36 may thus be used to effectively divide control modules 14a–n into one or more processing resources 38a–n in accordance with the respective module's capabilities.

In the preferred embodiment, auxiliary data files 36 also contain predefined allocation rules which further regulate the possible allocation of a programming object 25 to a module 14. For example, each module 14 has a limited capacity for supporting a particular type l of programming object 25. The module's capacity may be represented as at least one processing resource 38, as discussed above. If the number of type l programming objects 25 that needs to be allocated is greater than the number of compatible processing resources 38, then the allocation rules may dictate that the graph model be constructed such that an edge is drawn from each type l object 25 to every compatible resource 38. If, however, the number of compatible resources 38 is greater than or equal to the number of type l objects 25 that needs to be allocated, then the allocation rules may dictate that the graph model be constructed such that only a single edge is drawn between each type l object 25 and any one compatible resource 38 of each compatible control module 14. In any event, regardless of the allocation rules, the data in files 36 is used, in conjunction with the data in files 28 and 30 stored in memory 20, to determine all the possible allocations of each programming object 25 to processing resources 38a–n, and ultimately to control modules 14a–n. Preferably, data files 36 also contain other factors that influence the determination of the possible allocations, such as parameters representing weighting considerations as will be explained more fully below.

In the preferred embodiment of the present invention, the allocation of non-virtual objects to control modules 14a–n is constrained by, and thus defined by, the spatial or physical relationships between the non-virtual objects and modules 14*a–n*. On the other hand, the allocation of virtual objects to control modules 14*a–n* is not subject to physical or spatial constraints and thus is determined algorithmically using a weighted matching algorithm. The algorithmic method maximizes utilization of processing resources 38*a–n*, minimizes network communications on link 16, balances the computational load among modules 14*a–n*, as well as takes into consideration other task-related or cost-related system constraints necessary to system 10 or that may be specified by a user. However, in other embodiments of the invention, both virtual and non-virtual objects may be allocated using a similar approach.

Figure 4:
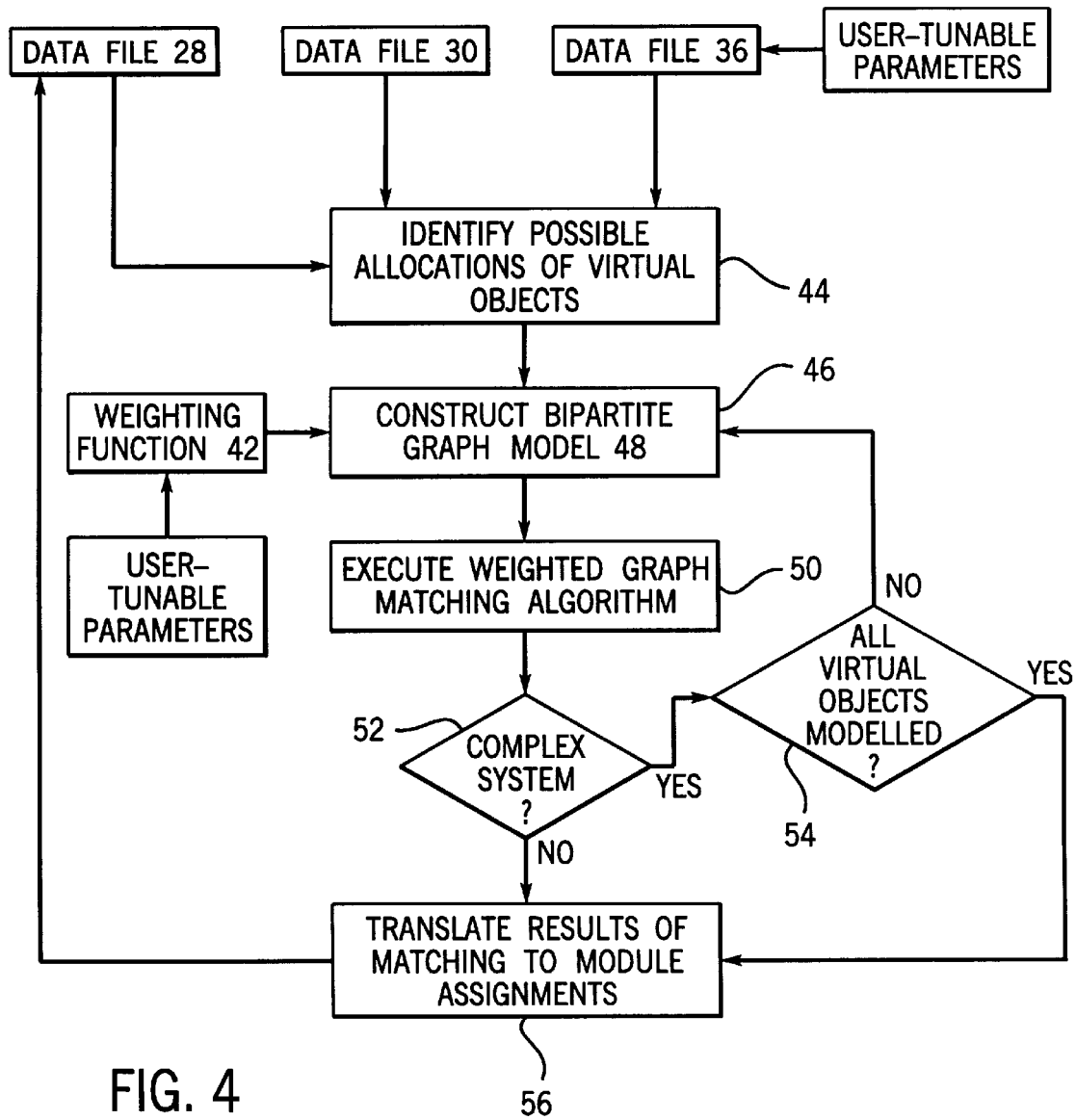
FIG. 4 is a flow chart representing the steps of an exemplary allocation of programming objects to the control modules using the data and other information stored in the host controller's memory, as illustrated in FIG. 3, in accordance with one aspect of the invention.
Figure 6:
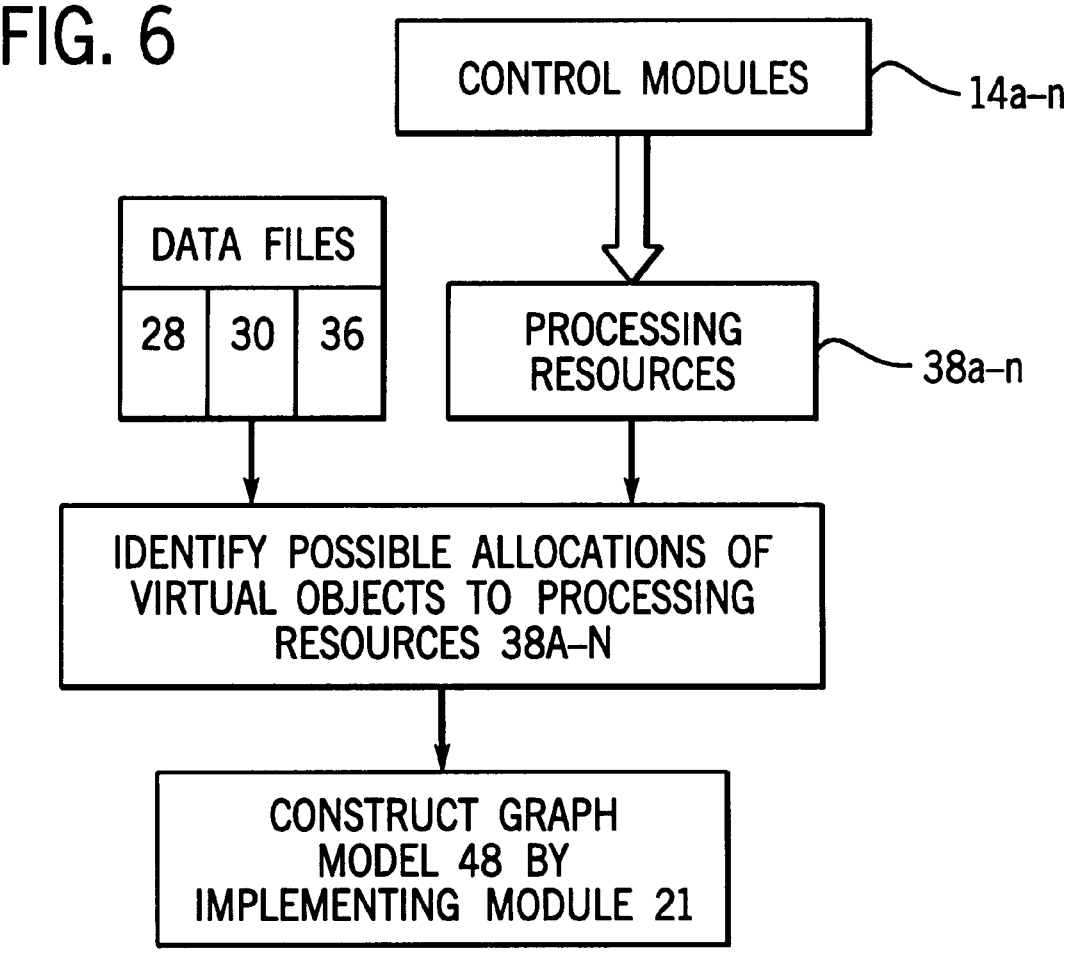
FIG. 6 is a flow chart representing the steps of an allocation of programming objects to the control modules which illustrates the control modules as being represented by processing resources.

To perform the allocation and with reference to FIGS. 4 and 6, data file 30 is received, which is generated as discussed above and which represents the logical relationships among programming objects 25*a–n*. Further, data file 28, preferably generated as discussed above, is provided, which specifies the spatial or physical relationships between the non-virtual objects and the control modules 14*a–n*, thus defining the allocation of the non-virtual objects to the appropriate modules 14. Data files 28 and 30 are then stored in memory 20 of host controller 12. Further, as discussed above, auxiliary data files 36, which also are stored in memory 20, provide information defining the processing capabilities of control modules 14*a–n*, guide the application of any allocation rules that may be in place, and provide other system-related parameters. In block 44 of FIG. 4, the information included in data files 28, 30, and 36 is then used to determine the various possible allocations of each virtual object to processing resources 38*a–n*. In other words, possible allocations are influenced by the relationships between programming objects 25*a–n*, the demands of programming objects 25*a–n* as compared to the processing capabilities of control modules 14*a–n*, the allocation rules and, ultimately, the values of any system-related parameters.

In the next step of the process, illustrated in block 46 of FIG. 4, modeling module 21 (FIG. 3) of host controller 12 constructs a bipartite graph model 48 which represents the possible allocations of each virtual object to processing resources 38*a–n* in conformance with any allocation rules. Modeling module 21 may be implemented as hardware or firmware, but preferably is a software subroutine. Graph model 48 includes a first set of vertices which represent the virtual objects and a second set of vertices which represent processing resources 38*a–n*. A set of edges interconnects the first and second set of vertices in accordance with the possible allocations that were previously identified.

Figure 5:
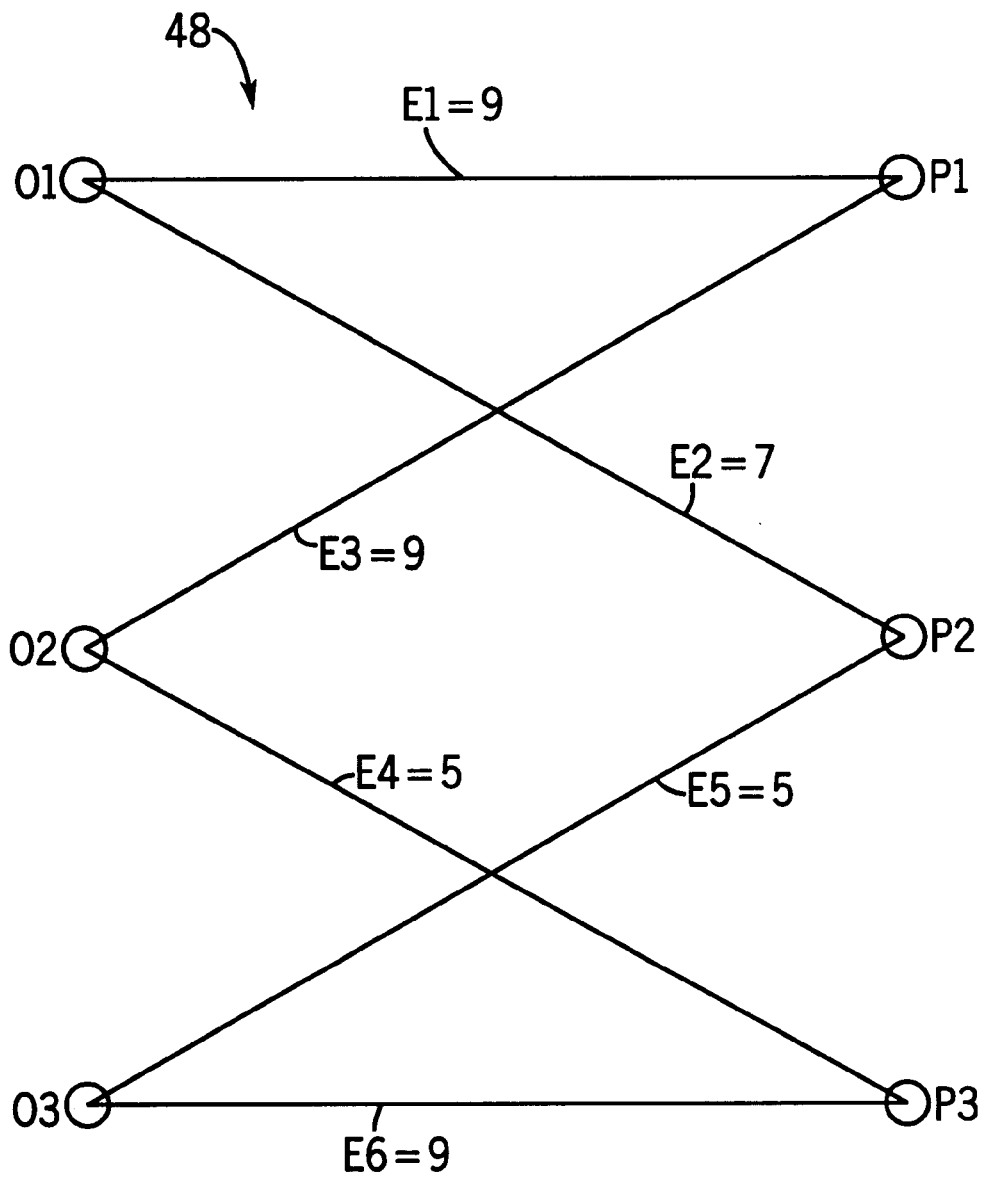
FIG. 5 illustrates an exemplary weighted graph model that is constructed during the allocation process shown in FIG. 4, in which the graph model represents the possible as of programming objects to processing resources.

FIG. 5 illustrates an example of a graph model 48 in which vertices O1, O2, and O3 represent virtual objects and vertices P1, P2, and P3 represent the available processing resources 38. Edges E1, E2, E3, E4, E5, and E6 interconnect vertices O1–3 to vertices P1–3 in accordance with the identified possible allocations. In the preferred embodiment illustrated in FIG. 5, constructing graph model 48 further includes assigning a weight to each edge. The assigned weight represents a benefit associated with allocating a particular virtual object to a particular processing resource.

Modelling module 21 assigns the weights in accordance with a predefined weighting function 42 stored in memory 20 of host controller 12. Weighting function 42 defines the benefit of allocating each virtual object to a particular processing resource and includes a number of parameters having values that may be varied by a user during the allocation process via user interface 26 to refine or "tune" the resulting allocation, or that, alternatively, have fixed values. The parameters represent weighting considerations such as the average response time of each processing resource, minimum and maximum response times of each processing resource of the distributed control system, desired speed of the allocation, percentage load balance offset among the processing resources, percentage utilization of control module capacity, relative weights between communication load and critical loop closure, communication frequency between programming objects, size of the communication packets transmitted via communication link 16, or other user-defined cost-related functions. Data representing the values of each of the parameters is stored in data file 36. In alternative embodiments, the weights assigned to each edge may be of the same magnitude, or the weighting function 42 may be used to define the cost, rather than the benefit, associated with each allocation. Or, users may supply their own specialized weighting functions in addition to tuning the values of the parameters in data file 36. The maximum matching algorithm, however, is invariant with respect to the weighting scheme used.

It should also be understood that, depending on the type of matching algorithm used, graph model 48 need not be a weighted graph. That is, in alternative embodiments, the edges of the graph model may not be weighted and, thus, the use of weighting function 42 may be optional.

In the next step illustrated in block 50 of FIG. 4, matching module 23 of host controller 12 determines a maximum matching of the graph model 48. Matching module 23 may be implemented as hardware or firmware, but preferably is a software subroutine. As is well known in the art, matching is a classical graph problem that is solved by finding a set of edges, no two of which are incident on the same vertex. Many known, efficient computational algorithms are available for solving the matching problem Ideally, such matching algorithms will be maximum matching algorithms. That is, such an algorithm will yield a maximum matching, meaning that the matching contains all possible edges, no two of which are incident on the same vertex.

Classical maximum matching algorithms typically find a maximum matching by using a method based on augmenting paths. An augmenting path between two unmatched vertices is a path comprising an alternating sequence of unmatched and matched edges. After determining such an augmenting path, the algorithm next determines whether the resulting matching may be augmented. That is, in the case of maximum matching algorithms, a matching may be augmented if a new matching can be found that includes one more edge than the previous matching. The augmenting process is repeated iteratively until a maximum matching is obtained, which, by a classical result known as Berge's Lemma, occurs if and only if an augmenting path cannot be found.

Maximum matching algorithms may also include weighted maximum matching algorithms. For weighted maximum matching algorithms, the edges of the graph are assigned a weight (as described above) and an augmenting path is deemed to be determined only if the total weight of the matched edges is increased after augmentation. For example, one method that may be used to augment a weighted matching is to unmatch the matched edges and match the unmatched edges in the augmenting path and then determine whether the new matching has a greater weight than the previous matching.

By way of illustration and with reference to FIG. 5, a weighted maximum matching is represented by the edges O1–P2, O3–P3, and O2–P1, which represent an allocation of virtual object O1 to processing resource P2, object O3 to processing resource P3, and object O2 to processing resource P1. It can be seen by this example that the matching cannot be augmented since an augmenting path (i.e., a path including one more matched edge) does not exist. Accordingly, the matching is maximum. It can also be seen that this maximum matching has the heaviest weight, thus representing the allocation having the greatest benefit. It can further be seen from this example that the weighted maximum matching problem cannot be solved by simply selecting the maximum weighted edge for each object. Thus, the problem is best solved algorithmically by using, for instance, the method based on augmenting paths, as described above.

In the preferred embodiment of the invention, matching module 23 finds an allocation of virtual objects to processing resources 38a–n by executing a weighted maximum matching algorithm on graph model 48 to find the maximum matching having the heaviest weight, thus representing the allocation having the maximum benefit. Gabow's Algorithm, as is well known to one of ordinary skill in the art and which is described in Harold N. Gabow's 1976 Ph.D. thesis entitled "Implementation of Algorithms for Maximum Matching on General Graphs" (available from Stanford University), is preferred, although other well-known maximum matching or weighted maximum matching algorithms may be used, such as Edmonds' Algorithm or the Ford-Fulkerson Method. Alternatively, a weighted maximum matching algorithm may be used to determine a matching having the lightest weight by adjusting the edge weights suitably, thus representing the allocation having the minimum cost.

In a distributed control system having a large number of programming objects and processing resources, the computing time required to determine the resulting allocation may be unacceptably long. This outcome results because the computing time required to execute the maximum matching algorithm and determine the resulting allocation scales approximately as a cubic function of the number of programming objects that must be assigned. In a distributed control system having more than four thousand objects (i.e., a complex distributed control system; see decision block 52 of FIG. 4), it is preferable to solve the matching problem iteratively, thus controlling the computational time required for allocation. Accordingly, because the number of programming objects is the limiting factor, a first graph model 48 is constructed which represents all the possible allocations of only a subset of the virtual objects to the compatible processing resources. In the preferred embodiment, no more than five hundred virtual objects are included in the first graph model 48. After a maximum matching is found for first graph model 48, a second graph model 48 is constructed which represents all the possible allocations of the next subset of virtual objects to the remaining available compatible processing resources. The weighted matching algorithm is executed on the second graph model 48 to find a maximum matching. The graph construction and algorithm execution steps are repeated until all of the virtual objects have been modelled (block 54) and an optimum allocation has been obtained.

In alternative embodiments, other methods may be used to limit the amount of computing time required to perform the allocation. For example, after weighing system costs against the benefits of achieving a maximum matching, the user may determine that the optimum allocation may be one in which not all of the programming objects are allocated. Thus, the user may elect to configure the maximum matching algorithm such that it terminates after, for example, a predetermined number of objects or subsets of objects have been modelled and matched. Any unallocated programming objects may then be manually allocated to the control modules. Or, if a modified weighted maximum matching algorithm is used, the computation may be terminated after the algorithm has determined a maximum matching that yields at least a minimum acceptable benefit or, at most, a maximum tolerable cost.

Returning to FIG. 4, in the final step of the system configuration process illustrated in block 56, the results of the maximum matching algorithm are translated into assignments of each virtual object to a particular control module 14a–n which are then put in the form of a data or text file. In the preferred embodiment, the information contained in this file will be used to rewrite data file 28, which originally included only the information related to the allocation of non-virtual objects to control modules 14a–n. The resulting data file 28 thus includes the assignments of all programming objects 25a–n of system 10 to control modules 14a–n.

Using the information contained in data file 28, host controller 12 determines the appropriate partitions to make in the program code of control program 22 by methods well known to those skilled in the art. After the partitions are determined, the program code corresponding to programming objects 25a–n is downloaded to the appropriate control module 14 where the portion of the program code is stored in memory 32 for execution during the operation of system 10.

Although the foregoing description has been provided for the presently preferred embodiment of the invention, the invention is not intended to be limited to any particular arrangement, but is defined by the appended claims. For example, other types of maximum matching algorithms may be used, the maximum matching algorithm may be used to allocate both virtual and non-virtual objects, or the user may input other parameters or weighting factors to control the allocation process. These and other alternative configurations of the invention, that may occur to those skilled in the art, are intended to form a part of the invention to the extent such alternatives fall within the scope of the appended claims.

What is claimed is:

1. A method for allocating a plurality of programming objects of a control program configured to control a distributed control system, wherein the control system includes a plurality of controller nodes connected to a communications link, and the control program includes program code corresponding to the plurality of programming objects, the plurality of programming objects including virtual objects and non-virtual objects, the method comprising:
   identifying logical relationships among the plurality of programming objects;
   identifying a processing resource associated with each controller node;
   determining possible allocations of the virtual objects to the controller nodes based on at least the identified processing resources and the logical relationships among the plurality of programming objects;
   constructing a graph model representing at least a portion of the possible allocations, the graph model including a first set of vertices representing at least a first portion of the virtual objects, a second set of vertices representing the processing resources compatible with the at least first portion of virtual objects, and a set of edges interconnecting the first and second set of vertices; and
   applying a maximum matching algorithm to the graph model to determine an allocation of the at least first portion of virtual objects to the controller nodes.

2. The method of claim 1, further comprising:
   determining an allocation of the non-virtual objects to the controller nodes; and
   partitioning the program code of the control program based on the allocations of the virtual objects and the non-virtual objects.

3. The method of claim 2, wherein a user determines the allocation of the non-virtual objects.

4. The method of claim 1, further comprising assigning a weight to each edge of the set of edges of the graph model, and wherein the maximum matching algorithm is a weighted maximum matching algorithm.

5. The method of claim 4, wherein the magnitudes of the weights assigned to the edges are equal.

6. The method of claim 4, wherein
the magnitude of the weight assigned to each edge interconnecting one of the virtual objects to one of the processing resources represents a benefit associated with allocating that virtual object to that processing resource, and
applying the weighted maximum matching algorithm to the graph model includes determining a matching representing the allocation having an optimum benefit.

7. The method of claim 6, wherein the optimum benefit is the maximum benefit.

8. The method of claim 1, wherein applying the maximum matching algorithm includes iteratively determining a matching until an augmenting path along the set of edges cannot be found.

9. The method of claim 4, further comprising:
defining a weighting function related to one of a cost and a benefit associated with the possible allocations; and
determining the magnitudes of the assigned weights based on the weighting function.

10. The method of claim 9, wherein the weighting function includes at least one tunable parameter and the value of the tunable parameter is selected by a user.

11. The method of claim 10, wherein the tunable parameter represents one of a percentage load balance offset among the processing resources, a percentage utilization of the processing resources, a speed of allocating the virtual objects, and a response time for the distributed control system.

12. The method of claim 1, further comprising:
defining at least one allocation rule,
wherein the possible allocations of the virtual objects are determined further in accordance with the allocation rule.

13. The method of claim 1, wherein identifying the processing resources includes identifying:
a type of microprocessor located at each controller node,
a type of programming object supported by each controller node,
a maximum number of each type of programming object supported by each controller, and
an execution time for each controller node for executing the program code associated with each type of programming object.

14. The method of claim 1, further comprising:
constructing a second graph model representing at least a portion of remaining possible allocations, the second graph model including a first set of vertices representing a second portion of the virtual objects, a second set of vertices representing the processing resources compatible with the second portion of virtual objects, and a set of edges interconnecting the first and second set of vertices; and
applying the maximum matching algorithm to the second graph model to determine an allocation of the second portion of virtual objects to the controller nodes.

15. A method for configuring a distributed control system, wherein the system includes a plurality of control modules communicating via a communications link, and each control module includes a memory circuit for storing program code corresponding to at least one of a plurality of programming objects of a control program configured to control the distributed control system, the method comprising:
identifying logical relationships among the plurality of programming objects;
identifying a processing resource associated with each control module;
determining possible allocations of the programming objects to the control modules based on at least the identified processing resources and the logical relationships among the plurality of programming objects;
constructing a graph model representing at least a portion of the possible allocations, the graph model including a first set of vertices representing at least a first portion of the programming objects, a second set of vertices representing the processing resources compatible with the at least first portion of programming objects, and a set of edges interconnecting the first and second set of vertices;
applying a maximum matching algorithm to the graph model to determine an allocation of the at least first portion of programming objects to the controller nodes;
partitioning the program code of the control program based on the allocation; and
storing the partitioned program code in the memory circuits of the control modules, wherein the program code stored in a particular memory circuit corresponds to the programming object allocated to the respective control module.

16. The method of claim 15, further comprising:
classifying each of the programming objects as one of a virtual object and a non-virtual object, wherein each non-virtual object is associated with a physical component having a physical location in the distributed control system;
identifying the physical location of the physical component associated with each non-virtual object; and
allocating the non-virtual objects to the processing resources based at least on the identified physical locations;
wherein the first set of vertices of the graph model represents virtual objects only.

17. The method of claim 16, wherein the non-virtual objects are allocated by a user.

18. The method of claim 15, further comprising assigning a weight to each edge of the set of edges of the graph model, and wherein the maximum matching algorithm is a weighted maximum matching algorithm.

19. The method of claim 18, wherein the magnitudes of the weights assigned to the edges are equal.

20. The method of claim 18, wherein
the magnitude of the weight assigned to each edge interconnecting one of the programming objects to one of the processing resources represents a benefit associated with allocating that programming object to that processing resource, and
applying the weighted maximum matching algorithm to the graph model includes determining a matching representing an allocation having an optimum benefit.

21. The method of claim 20, wherein the optimum benefit is the maximum benefit.

22. The method of claim 18, further comprising:
defining a weighting function related to one of a cost and a benefit associated with the possible allocations; and
determining the magnitudes of the assigned weights based on the weighting function.

23. The method of claim 15, further comprising:
constructing a second graph model representing at least a portion of remaining possible allocations, the second graph model including a first set of vertices representing a second portion of the virtual objects, a second set of vertices representing the processing resources compatible with the second portion of virtual objects, and a set of edges interconnecting the first and second set of vertices; and applying the maximum matching algorithm to the second graph model to determine an allocation of the second portion of virtual objects to the controller nodes.

24. A distributed control system, comprising:

a host controller including a memory to store a control program, the control program including program code corresponding to a plurality of programming objects having logical interrelationships; and a plurality of control modules in communication with the host controller via a communications link, each of the control modules having a processing capability sufficient to execute the program code associated with at least one of the programming objects;

wherein the host controller is configured to determine possible allocations of the programming objects to the control modules based at least on the logical interrelationships of the programming objects and the processing capabilities of the control modules, and the host controller is further configured to execute a maximum matching algorithm on the possible allocations to determine a resulting allocation of at least a portion of the programming objects to the control modules.

25. The system of claim 24, wherein the programming objects include virtual objects and non-virtual objects, and a user determines a resulting allocation of the non-virtual objects to the control modules.

26. The system of claim 25, wherein the host controller is further configured to construct a graph model representing the possible allocations of at least a first portion of the virtual objects, the graph model including a first set of vertices representing the at least first portion of virtual objects, a second set of vertices representing the processing capabilities sufficient to execute the program code associated with the at least first portion of virtual objects, and a set of edges interconnecting the first and second set of vertices, and wherein the host controller executes the maximum matching algorithm on the graph model to determine the resulting allocation of the at least first portion of virtual objects to the control modules.

27. The system of claim 26, wherein each edge of the set of edges has a weight and the maximum matching algorithm is a weighted maximum matching algorithm.

28. The system of claim 27, wherein the magnitudes of the weights of the edges are equal.

29. The system of claim 27, wherein the magnitude of the weight of each edge interconnecting one of the virtual objects to one of the processing capabilities represents a benefit associated with allocating that virtual object to that processing capability, and the resulting allocation determined by the host controller has an optimum benefit.

30. The system of claim 29, wherein the optimum benefit is the maximum benefit.

31. The system of claim 24, wherein each control module further includes a memory circuit, and the host controller is further configured to determine partitions of the program code based on the resulting allocation, and to transfer the program code contained within the partitions to the memory circuits of the control modules, wherein the program code transferred to a particular memory circuit corresponds to the programming object allocated to the respective control module.

32. The system of claim 26, wherein the host controller further constructs a second graph model representing the possible allocations of a second portion of the virtual objects, the graph model including a first set of vertices representing the second portion of virtual objects, a second set of vertices representing the processing capabilities sufficient to execute the program code associated with the second portion of virtual objects, and a set of edges interconnecting the first and second set of vertices, and wherein the host controller executes the maximum matching algorithm on the second graph model to determine a resulting allocation of the second portion of virtual objects to the control modules.

33. The system of claim 27, wherein the memory of the host controller further stores a weighting function related to one of a cost and a benefit associated with the possible allocations of the programming objects to the control modules, wherein the weighting function determines the magnitude of the weight of each edge of the set of edges.

34. The system of claim 33, further comprising a user interface in communication with the host controller, wherein the weighting function includes at least one tunable parameter and a user inputs the value of the tunable parameter via the user interface.

35. A method for allocating a plurality of programming objects of a control program configured to control a distributed control system, wherein the control system includes a host controller and a plurality of controller nodes connected to a communications link, and the control program includes program code corresponding to the plurality of programming objects, the plurality of programming objects including virtual objects, the method comprising:

providing data files accessible to the host controller, the data files containing information regarding processing capabilities associated with each of said plurality of controller nodes;

identifying a processing resource associated with each of said plurality of controller nodes;

determining possible allocations of the virtual objects to the controller nodes by applying allocation rules;

constructing a graph model representing at least a portion of the possible allocations;

assigning a weight to at least a set of edges of the graph model;

applying a weighted maximum matching algorithm to the graph model to determine allocations of at least a portion of the virtual objects to processing resources; and preparing assignments of the allocations of the at least a portion of the virtual objects to processing resources for partitioning the program code to the plurality of controller nodes.

36. The method of claim 35, wherein the step of assigning a weight includes the steps of providing a user interface operatively connected with the control system, accepting a value received from a user through said user interface, said value corresponding to a parameter associated with the information regarding processing capabilities, and assigning a weight to an edge of the graph model corresponding to the value received from the user.

* * * * *